United States Patent [19]

Runkle

[11] Patent Number: 4,636,180

[45] Date of Patent: Jan. 13, 1987

[54] UNIVERSAL JOINT WITH STATIONARY SEATS

[75] Inventor: Dean E. Runkle, LaPorte, Ind.

[73] Assignee: Allied Corporation, Morristown, N.J.

[21] Appl. No.: 797,757

[22] Filed: Nov. 12, 1985

Related U.S. Application Data

[63] Continuation of Ser. No. 643,597, Aug. 23, 1984, abandoned.

[51] Int. Cl.$^4$ .............................. F16D 3/20; B62D 1/18
[52] U.S. Cl. ..................................... 464/120; 403/116; 464/152
[58] Field of Search .................. 74/493; 403/113, 116; 464/112, 120, 122, 123, 124, 139, 141, 143, 147, 150, 152

[56] References Cited

U.S. PATENT DOCUMENTS

| | | | |
|---|---|---|---|
| 794,247 | 7/1905 | Palmer | 464/120 |
| 1,418,380 | 6/1922 | Keck | 464/120 |
| 2,526,105 | 10/1950 | Adams | 464/120 X |
| 3,076,322 | 2/1963 | Wildhaber | 464/123 |
| 3,092,982 | 6/1963 | Wildhaber | 464/120 |
| 3,107,505 | 10/1963 | Koss | 464/141 |
| 3,296,831 | 1/1967 | Miller | 464/136 X |
| 4,135,372 | 1/1979 | Benson | 464/112 X |
| 4,322,098 | 3/1982 | Warshawsky | 403/116 X |

FOREIGN PATENT DOCUMENTS

| | | | |
|---|---|---|---|
| 3143062 | 5/1983 | Fed. Rep. of Germany | 464/143 |
| 23328 | 7/1949 | Finland | 464/112 |
| 1233823 | 6/1971 | United Kingdom | 464/112 |

*Primary Examiner*—Stuart S. Levy
*Assistant Examiner*—Daniel P. Stodola
*Attorney, Agent, or Firm*—Larry J. Palguta; Ken C. Decker

[57] ABSTRACT

The universal joint (10) comprises a first shaft (12) with an annular head (14) having a cavity (16) therein and oppositely disposed seats (17, 19) about the perimeter of the cavity (16). The seats (17, 19) have inclined bottom surfaces (21) which displace radially inwardly a pair of seats (30) each having a cylindrical seat extension (34) terminating in a curved seat surface (38). The second shaft (22) has a head (24) with diametrically opposed recesses (26) each having a curved surface (28) therein. The head (24) of the second shaft (22) is captured between the seats (30) to provide a lash-free universal joint (10).

5 Claims, 3 Drawing Figures

UNIVERSAL JOINT WITH STATIONARY SEATS

This is a continuation of application Ser. No. 643,597, filed Aug. 23, 1984, now abandoned.

This invention relates to a universal joint, and more particularly to a universal joint for use in a steering column.

It is desirable to provide a universal joint in the steering column of a motor vehicle so that the steering column may be tilted according to the desire of the driver. Specifically, such a universal joint is disposed between two shafts of the steering column, with one shaft being attached directly to the steering wheel. The driver actuates a disengagement mechanism to release the steering wheel from a fixed position so that it may be tilted upwardly or downwardly.

It is important that the universal joint have a simple, low cost design and be substantially lash-free so that there is not any play present in the joint and which would be transmitted to the steering wheel. The universal joint must be able to withstand forces exerted upon the joint during a variety of driving conditions, and it should be maintenance free throughout the entire usable life of the automotive vehicle.

The present invention provides an inexpensive, easily manufactured universal joint comprising an upper yoke terminating in an annular head having an interior cavity therein. The annular head includes an opening in an end face, the opening communicating with the interior cavity to provide access therein for the head of a second shaft. Diametrically opposed longitudinal slot openings are located within walls of the cavity, each of the longitudinal slot openings having an inclined bottom surface. A pair of seats comprise rectangular portions each shaped complementary to the slots and extending radially inwardly in the form of a cylindrical seat extension which terminates in a curved seat surface. The rectangular portion of each seat is received in a respective slot such that movement of the rectangular portion along the longitudinal axis of the slot effects radially inward movement of the seat as a result of the inclined bottom surface. The second shaft member comprises the lower yoke of the universal joint and includes an oblong head having a pair of diametrically opposed recesses located in the head. Each recess is generally oval shaped and includes a bottom curved surface which is shaped complementary to the curved seat surfaces. The head of the lower yoke is received within the cavity such that the bottom curved surfaces slidingly engage in intimate contact the curved seat surfaces. Preloading of the universal joint may be accomplished by simply moving the rectangular portions of the seats longtitunally inwardly of the cavity so that the inclined bottom surfaces bias the seats radially inwardly.

One way of carrying out the invention is described in detail below with reference to the drawings which illustrate an example embodiment, in which.

Figure 1:
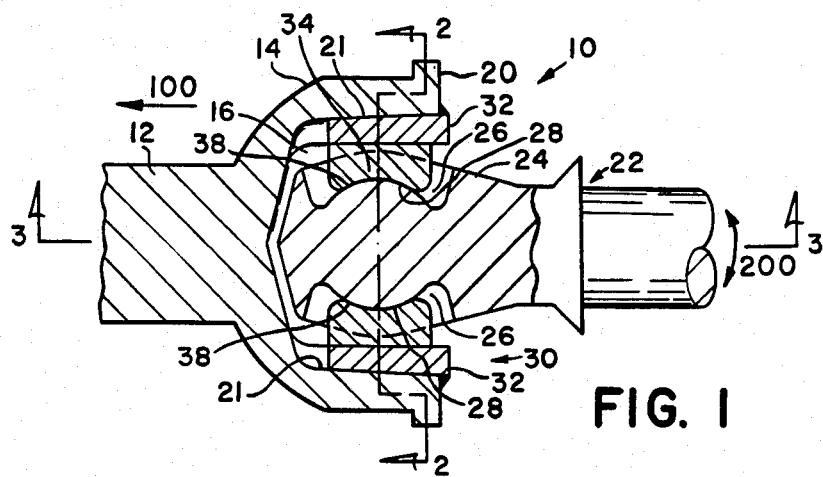
FIG. 1 is a cross section of the universal joint of the present invention.
Figure 2:
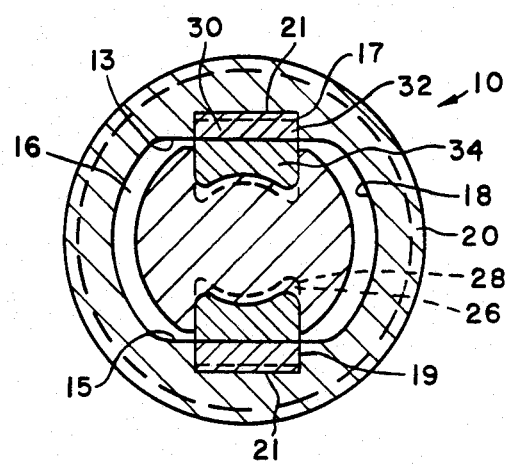
FIG. 2 is a cross section taken along view line 2—2 of FIG. 1.
Figure 3:
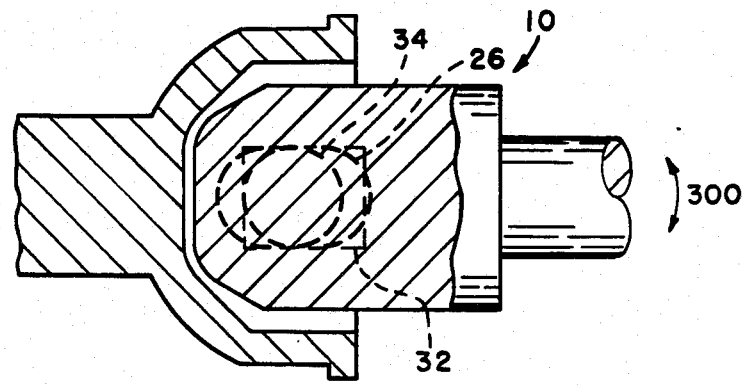
FIG. 3 is a cross section taken along view line 3—3 of FIG. 1.

Referring to FIGS. 1-3, the universal joint is referenced generally by numeral 10. Universal joint 10 comprises a first shaft 12 terminating in an upper yoke or annular head 14, and a second shaft 22 terminating in a lower yoke or oblong head 24. Annular head 14 includes an interior cavity 16 communicating with an opening 18 disposed in end face 20. Located within walls 13 and 15 of cavity 16 are a pair of diametrically opposed longitudinal slot openings 17 and 19. Each longitudinal slot opening 17 and 19 includes an inclined bottom surface 21 inclined along the longitudinal axis of shaft 12 and progressing radially inwardly of cavity 16 (see FIG. 1).

Second shaft 22 terminates in oblong head 24 which includes a pair of diametrically opposed recesses 26. Each recess 26 extends along the longitudinal axis of second shaft 22, and includes therein a recess curved surface 28. The recess curved surfaces are generally convex and extend radially outwardly from the longitudinal axis of shaft 22.

Each seat 30 includes a rectangular portion 32 integral with a cylindrical seat extension 34. The rectangular portions 32 are shaped complementary to slot openings 17 and 19 for reception therein, and each cylindrical seat extension 34 terminates in a curved seat surface 38 which is generally concave and having a radius of curvature complementary to the radius of curvature of the recess curved surfaces 28. Seats 30 have their rectangular portions 32 received within respective slot openings 17 and 19 whereby cylindrical seat extensions 34 extend radially inwardly of universal joint 10. Curved seat surfaces 38 slidingly engage the associated recess curved surfaces 28. Thus, oblong head 24 of second shaft 22 is captured between seats 30 located within the annular head 14 of first shaft 12. The seats 30 may be fixed within their respective longitudinal slots either by welding the seats to cylindrical head 14 or providing a mechanical attachment in the form of a specially shaped flat washer secured with screws, or by any other well-known securement method.

In order to eliminate lash and frictional losses in the universal joint, slot openings 17 and 19 have been provided with inclined bottom surfaces 21 which will bias seats 30 radially inwardly of joint 10. When universal joint 10 is assembled, seats 30 may be moved longitudinally inwardly of cavity 16 which, by means of inclined bottom surfaces 21, effects the radially inward displacement of seats 30. The inward displacement of seats 30 causes a corresponding inward movement of the curved seat surfaces 38 against the associated recess curved surfaces 28, whereby preloading may be achieved by simply adjusting the longitudinal positions of the seats 30 relative to their associated slot openings 17 and 19. Such adjustment, followed by fixing or securing of the seats to cylindrical head 14, accomplishes continuous and intimate lash-free engagement between the surfaces 28 and 38 so that joint 10 is substantially free of lash and frictional losses. Universal joint 10 permits movement of shafts 12 and 22 relative to one another through the engagement of the surfaces 28 and 38, as further illustrated in FIG. 3 wherein upper cylindrical seat extension 34 is shown received within the generally oval shaped recess 26, thereby permitting movement of second shaft 22 in the direction of arrows 200 and 300 of FIGS. 1 and 3, respectively.

Although this invention has been described in connection with the illustrated embodiment, it will be obvious to those skilled in the art that various changes may be made in the form, structure, and arrangement of parts without departing from the invention.

What is claimed is:

1. A universal joint having first and second members capable of being rotated with their axes angularly disposed relative to one another, consisting of a first head located at an end of the first member, the first head having a cavity with slot openings disposed oppositely from one another along the perimeter of the cavity, the slot openings extending along the longitudinal axis of said first member, a pair of unitary seats each shaped complementary to and received in a respective slot opening so that the unitary seats are disposed stationary relative to the first member, each unitary seat including a projection extending radially inwardly of said cavity and terminating in a curved seat surface, the second member including a second head received within said cavity, said second head including a pair of oppositely disposed recesses having longitudinal axes parallel to the axis of said second member, and each recess having a curved surface complementary to and engaging an associated curved seat surface to permit multi-directional movement therebetween so that said members may be rotated relative to one another, said slot openings comprising generally longitudinal openings in said perimeter and each radially outermost surface of a slot opening being disposed at an angle relative to a longitudinal center line of said first member, each of the outermost surfaces being inclined so that initial placement of a respective unitary seat in a direction along the longitudinal axis of the first member displaces the seat radially inwardly to provide lash-free engagement between said curved surfaces and curved seat surfaces.

2. The universal joint in accordance with claim 1, wherein said recesses of said second member each comprise a generally oval-shaped opening having therein a convex curved surface.

3. The universal joint in accordance with claim 1, wherein the curved seat surface of each of said projections comprises a concave surface and the associated complementary shaped curved surface is convex.

4. The universal joint in accordance with claim 1, wherein said initial placement of said seats along said direction disposes progressively the curved seat surfaces into closer intimate contact with the associated curved surfaces of the recesses which comprise oval-shaped openings, to provide loading and lash-free engagement therebetween.

5. A universal joint having first and second members capable of being rotated with their axes angularly disposed relative to one another, consisting of a first head located at an end of the first member, the first head having a cavity with a pair of oppositely disposed seats located therein, the second member including a second head received within said cavity, characterized in that the cavity consists of oppositely disposed longitudinal slot openings along the perimeter of the cavity and the slot openings extending along a longitudinal axis of the first member, the slot openings each having a radially outer surface disposed at an angle relative to the axis of the first member, the seats each being unitary and received in a respective slot opening so that each unitary seat is disposed stationary relative to the first member, the unitary seats each including a projection extending radially inwardly of the cavity and terminating in a curved seat surface, the second head including a pair of oppositely disposed recesses having longitudinal axis parallel to the axis of said second member and each recess having a curved surface complementary to and engaging an associated curved seat surface to provide multi-directional movement therebetween, each of the outer surfaces being inclined so that initial placement of a respective unitary seat in a direction along the longitudinal axis of the first member displaces the seat radially inwardly to provide lash-free engagement between said curved surfaces and curved seat surfaces.

* * * * *